ably rated motor means...

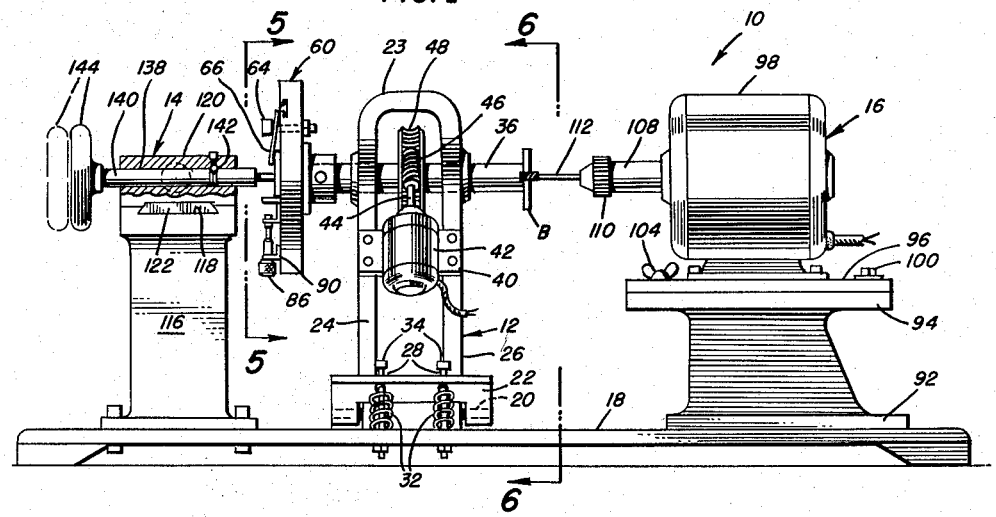
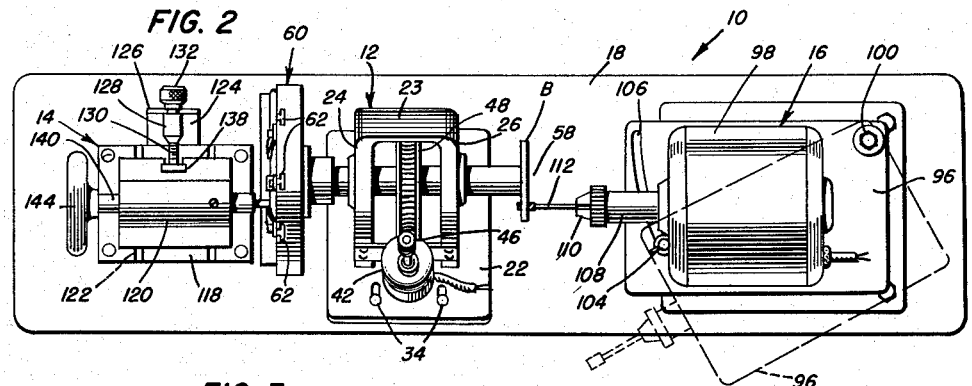
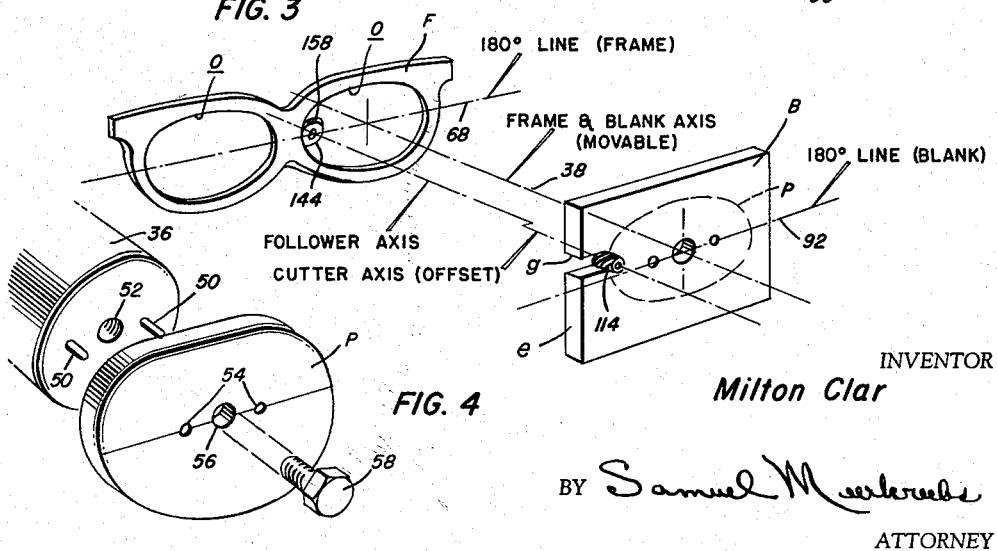
INVENTOR
Milton Clar

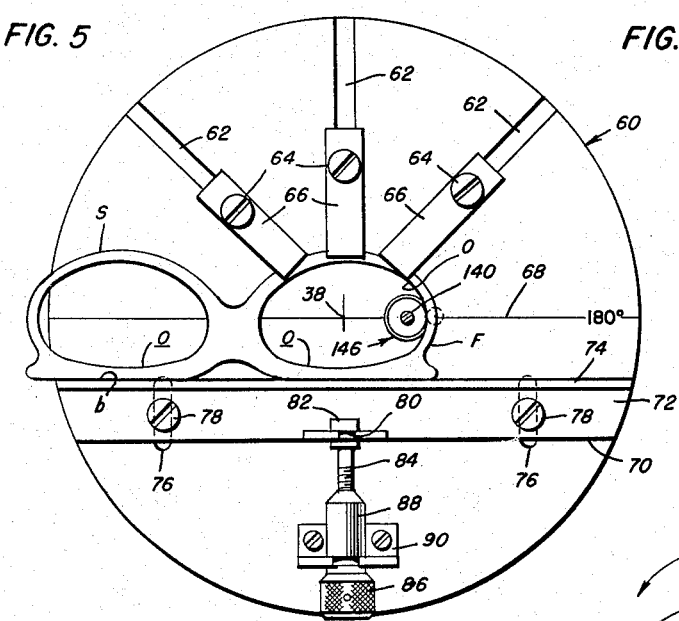
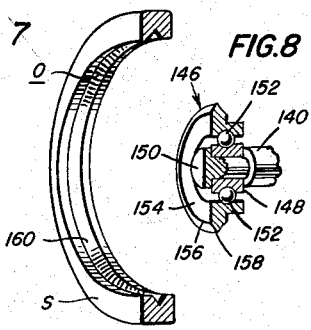
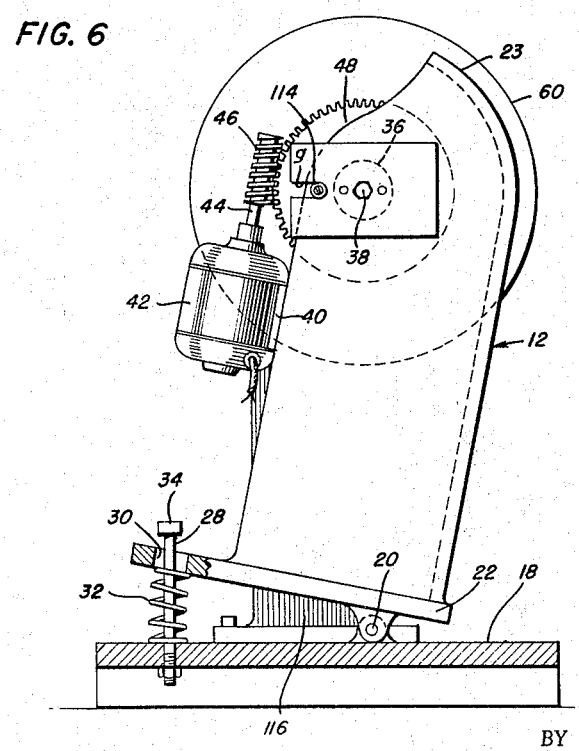
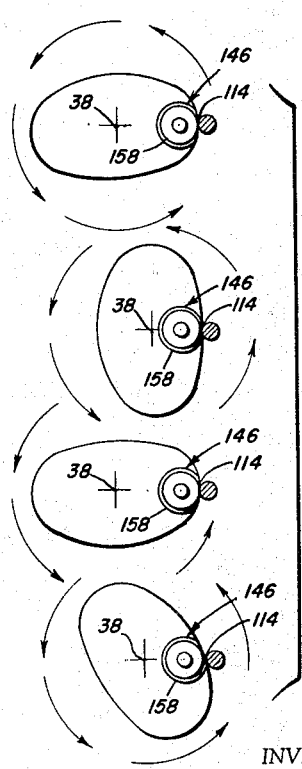

United States Patent Office
3,170,374
Patented Feb. 23, 1965

3,170,374
APPARATUS FOR PRODUCING LENS PATTERNS FROM SPECTACLE FRAME LENS OPENINGS
Milton Clar, 2444 Ross Road, Silver Spring, Md., assignor of one-third to Russell M. Malamut, Silver Spring, Md., and one-third to William T. Dunlap, Fanwood, N.J.
Filed Apr. 26, 1962, Ser. No. 190,276
15 Claims. (Cl. 90—13.9)

This invention relates generally to machines for making patterns to be used as a guide or template and more particularly to apparatus whereby a lens pattern for lens edge grinders can be produced by using spectacle frame lens openings as a guide or female pattern.

Lens openings of spectacle frames have many different shapes, varying according to sizes and different styles of frames produced by different frame manufacturers. Some manufacturers provide a pattern which can be used on a conventional edge grinder. However, because of the varied stocks of frames, the average optician, when confronted with an unusual lens configuration, must produce a grinder machine pattern by hand, tracing the lens opening of a spectacle frame on pattern forming material while maintaining the major and minor axes of the lens opening in proper orientation with respect to alignment pin openings on the pattern material.

After the shape of the lens opening is traced, the pattern material must be ground down on a grinder stone. This custom or hand making a lens pattern is not only time consuming and subject to inaccuracies due to the capabilities of a person producing the pattern, but raises the costs of lens replacement and/or production.

A primary object of the present invention is to provide a novel apparatus for automatically producing male lens patterns whereby the edge grinder pattern is produced utilizing a spectacle frame lens opening as a guide whereby the lens pattern shape produced will substantially duplicate the lens opening of the spectacle frame.

Another object of the present invention is to provide means whereby lens patterns can be readily and substantially immediately produced to thus obviate the maintaining and cataloguing of a supply of edge grinder patterns.

A further object of the present invention is to provide novel lens edge grinder patterns from spectacle frame openings whereby the pattern axes are properly oriented and maintained.

The foregoing is indicative in a general way of the nature of the invention. Other objects and the specific nature and advantages of the disclosed embodiment of the instant invention will be apparent from the following description taken in conjunction with the accompanying drawings, wherein:

FIGURE 1 is a side elevation of the novel apparatus, with a portion broken away for the purpose of showing details of a follower rod detent;

FIGURE 2 is a top plan view of FIGURE 1, showing in phantom lines a displaceable mounting for the cutter assembly of the invention;

FIGURE 3 is an enlarged diagrammatic view showing the axial relationship of the lens opening follower and cutter in relation to a pattern blank being shaped to conform to the lens opening; further showing the major and minor axis alignment of the lens opening and pattern blank with respect to mounting apertures in the pattern blank;

FIGURE 4 is an enlarged fragmentary perspective view of a lens pattern in relation to a support shaft used on the subject invention on a conventional edge grinder;

FIGURE 5 is an enlarged vertical section taken substantially on the plane of line 5—5 of FIGURE 1, showing details of the spectacle frame orienting and clamp structure;

FIGURE 6 is an enlarged vertical section taken substantially on the plane of line 6—6 of FIGURE 1, with a portion broken away for purposes of clarity;

FIGURE 7 is an enlarged, fragmentary portion of a spectacle frame, showing the lens receiving groove on the inner periphery of the lens opening;

FIGURE 8 is an enlarged fragmentary perspective view of a lens opening follower, with portions shown in section to show a construction detail; and FIGURE 9 is a series of diagrammatic views showing the changes of position for the spectacle lens opening during 360 degrees of rotation in order to form a lens pattern conforming to the lens opening.

Referring to the drawings in detail, the novel apparatus is indicated generally at 10 and comprises a blank and pattern support assembly indicated generally at 12, a guide support assembly 14 and a cutter support assembly 16.

The assemblies 12–16 are suitably mounted on a support base or plate 18 which, as seen in FIGURE 6, includes a longitudinal hinge axis portion 20 for supporting the blank and pattern support assembly for vertical oscillation. The assembly 12 includes a base plate 22 which is hinged on the hinge axis portion 20 of plate 18. The plate 22 includes a vertically extending, substantially inverted U-shaped support member 23 having legs 24 and 26. The plate 18 has mounted thereon a pair of support bolts 28 extending loosely through enlarged apertures 30 in the plate 22. Circumposed about the bolts 28 between plates 18 and 22 are compression springs 32 which urge the plate 22 about axis portion 20 in a clockwise direction as seen in FIGURE 6. The heads 34 of bolts 28 limit the extent of separation of plates 18, 22 about the hinge axis portion.

The U-shaped support member 23 has extending transversely through legs 24, 26 and freely journaled therein, a support shaft or arbor 36, the longitudinal axis 38 of which being disposed in a substantially vertical plane passing through the hinge axis portion 20 of plates 18, 22.

Mounted on a support plate 40 secured to legs 24, 26 of the support member 23 is suitably rated motor means 42 which includes an upwardly extending power take-off or drive shaft 44 terminating in a helical driving worm 46. The motor means 40 may include conventional speed reduction means to afford proper speed of rotation of shaft 44.

The arbor or support shaft 36 includes in fixed relation on an intermediate portion thereof a driven gear 48 having suitable teeth meshingly engaged with the drive worm 46.

The arbor 36 includes on the end adjacent the cutter support assembly 16, a pair of diametrically opposed, longitudinally extending mounting or support pins 50 equidistant from an internally threaded, axial bore 52. This construction is similar to that found on conventional pattern support arbors for lens edge grinders (not shown). The pins 52 will receive thereon a suitably apertured pattern blank B which will ultimately be shaped to form a pattern disc P; see FIGURES 3 and 4. The apertures 54 will be located on the major axis of the blank B or pattern P and disposed therebetween is an aperture 56 alignable with the internally threaded axial bore 52 for receiving a headed fastener 58 thereon.

The arbor 36 includes on the end opposite that to which the blank B is mounted, a spectacle frame clamp or mounting plate 60 which includes a plurality of radially disposed slots 62 for accommodating nut and bolt assemblies 64 which are used to mount clamping spring fingers 66 thereon. Spaced below a gauge line 68 formed on the outer surface of plate 60 and parallel thereto is an angle element 70 which includes a lower leg 72 juxtaposed on the outer surface of mounting plate 60 and a laterally projecting leg or flange 74 upon which the bridge portion $b$ of the spectacle frame F will be supported. The plate 60 includes a pair of parallel, spaced slots 76 normal to the gauge line 68 and receiving therein retaining nut and bolt assemblies 78 mounted in suitable apertures in leg 72 of angle elements 70.

The lower leg or flange 74 is centrally notched at 80 and has journaled therein the head portion 82 of a micrometer screw 84. The screw 84 includes a lower knurled knob 86 and is journaled for rotation in a bearing element 88 fixed to the outer surface of plate 60 by a bracket 90. The micrometer screw 84 will permit proper orientation of the major axis of the spectacle frame lens opening O with the gauge lines 68 which intersect with the longitudinal axis 38 of arbor 36.

It will now be observed in the absence of additional structure as seen in FIGURE 3, the major axis 92 of the blank B coincides with a line passing through apertures 54 and is disposed parallel to and in substantial coplanar alignment with the major axis 68 of the spectacle frame F when the frame is mounted on the plate 60 by spring fingers or clamps 66. Further, as the spectacle frame is rotated on arbor 36, driven by power means 40, the blank B will also rotate. Although an electric motor 40 and worm drive 48 are described in the exemplary embodiment, any other suitable means may be utilized to rotate arbor 36, for example, a hand operated Bowden wire drive, etc.

The cutter support assembly 16 comprises a support base 93 suitably secured on base plate 18. The support base 93 includes a horizontal support plate 94 having juxtaposed thereon a motor mounting plate 96 to which is secured a second motor means 98 comprising a suitably rated electric motor. The plate 96 is mounted for horizontal pivotal movement with respect to plate 94 by a shaft element 100 extending through plates 94 and 96 and the plate 94 includes an arcuate slot 102, see FIGURE 2, therethrough, which is concentric to the shaft element 100. Extending through the plate 96 and through the slot 102 is an abutment element 104 comprising a wing nut and bolt assembly, and the end 106 of the slot 102 when engaged by the abutment element 104 will orient the drive shaft 108 of the motor means 98 in parallel relation to the longitudinal axis of arbor 36. The wing nut and bolt assembly can be utilized to maintain the longitudinal axes of the drive shaft 108 and arbor 36 in fixed parallel relation during operation of the apparatus.

The drive shaft 108 includes a terminal collet assembly 110 of any suitable character for removably mounting an end milling tool 112. The milling tool includes a terminal effective cutting edge 114 which will be substantially colinear with a guide element to subsequently be described.

After the blank B is mounted on the end of the arbor 36 by bolts 58, when the cutter 112 is swung from the phantom line position to the solid line position shown in FIGURE 2, the effective cutting edge 114 will engage the edge $e$ of blank B and will cut a lateral groove $g$ therein, the effective cutting edge eventually coinciding with one point on the outer edge of the pattern P to be produced from the blank B as seen in FIGURE 3.

Other types of cutter means other than that particularly disclosed can be used, for example, a reciprocating saw blade, grinding wheel, etc.

The guide support assembly 14 comprises a vertical support 116 suitably secured on base plate 18. The support 116 includes a transverse dove-tail slot 118 in the upper surface thereof and reciprocably supports therein a mounting block 120 having a depending tongue 122 conforming to the slot 118. Projecting laterally from one side of the support 116 is a support plate 124 which has fixed to a vertical flange 126 an internally threaded support sleeve 128; see FIGURE 2. Extending through the sleeve 128 is a micrometer screw 130 having a knurled knob 132 at the outer end, the inner end 134 being journaled in a suitable slot 138 in block 120. By rotating the screw 130, an operator of the machine can adjust the block 120 transversely of the longitudinal axis of the arbor 36.

The block 120 has extending therethrough a longitudinal bore 139; see FIGURE 1, which is parallel to the longitudinal axis of arbor 36 and cutter 112. Reciprocably supported in the bore 138 is a support rod 140 which is retained in a relatively fixed position by spring urged detent means 142. The outer end of the shaft 140 has fixed thereto a handle 144 which permits the rod 140 to be drawn toward the left as shown by phantom lines in FIGURE 1.

Journaled on the inner end of rod 140 is a guide roller or cam follower 146; see FIGURE 7, which includes an inner race 148 retained on the rod 140 by a machine screw 150. Bearing elements 152 are seated on the race 148 and have circumposed thereabout an outer race 154. The outer periphery of the race 154 comprises a beveled edge 158 which substantially conforms to the lens edge receiving groove 160 conventionally formed in the inner periphery of spectacle frame openings O.

It will be noted from FIGURE 3 that the outer periphery of edge 158 is in alignment with the effective cutting edge 114 of mill end tool 112.

Operation

The pattern blank will have formed therein the holes 54 to permit the pattern P to be mounted on accommodating portions of a conventional lens edge grinder.

The spectacle frame F will be mounted on plate 60 with the major and minor axes of the lens opening being properly aligned with the longitudinal axis of the arbor 36 by means of guide line 68. The support rod 140 will be moved inwardly to the position shown in FIGURES 1 and 2, whereby the guide roller edge 158 will be received in the groove 160 about the spectacle frame opening O.

The springs 32 will bias the arbor substantially to the left of the guide roller 146 as viewed in FIGURE 5 prior to receipt of the guide roller 146 in opening O, and thus when the roller 146 is disposed in the spectacle frame opening O, the frame 23 will have to be moved toward the right against the pressure of springs 32, and thus the frame F will be urged onto the roller edge 158 due to the pressure of the springs 32.

After frame F is properly oriented, and the guide roller is received in the frame, the motor means 98 is activated and the mill end cutter will be swung from the phantom line position of FIGURE 2 to the solid line position, thus forming the entry groove $g$ in blank B. The mill end cutter 112 will be rotated inwardly in the direction indicated by the arcuated direction arrow of FIGURE 3 to tend to urge the blank, i.e., support frame 23, toward the guide roller 146.

After the entry groove $g$ is formed, the motor means 42 is activated. This will cause rotation of the arbor 36 and simultaneous rotation of the blank B and spectacle frame F.

Considering FIGURES 9a–9d, in FIGURE 9a there is shown diagrammatically the relative position of the lens opening O, guide roller 146, cutter 112, arbor axis 38 and mounting plate 60; see FIGURE 5. As the arbor is rotated, the spectacle frame opening O provides a cam surface which causes the support member 23 to oscillate on the hinge axis portion 20 to move the longitudinal axis 38 of the arbor progressively through the positions shown in FIGURES 9a–9d, and ultimately back to the initial position of FIGURE 9a. When this is accomplished, the effective cutting edge 114 of the mill end cutter will have formed the pattern P from the blank as indicated in phantom lines in FIGURE 3.

The lens opening O will be substantially centered on the longitudinal axis 38 of the arbor 36. The pivot axis portion 20, it will be noted, is located on a vertical plane passing through the longitudinal axis 38 of the arbor 36 and during 360 degrees of rotation of the arbor 36, the horizontal movement will occur on a very shallow arc, i.e., on a radius between the pivot axis portion 20 and axis of arbor 36.

Resulting pattern P will be a substantial duplicate of the lens opening O and thus there is accurately, rapidly and automatically produced a satisfactory edge grinder pattern. The pattern when installed on a conventional edge grinder will produce a lens which will substantially conform to the lens opening O from which the lens pattern was produced originally.

The adjusting screw 130 permits the offsetting of the guide wheel edge 158 with respect to the effective cutting edge 114 of the mill end cutter 112. This permits slightly over-sized and under-sized patterns to be produced.

Although a preferred embodiment has been illustrated and described, modifications may be made without departing from the spirit of the invention, and thus, the invention is not limited to the precise details set forth, but only as defined by the scope of the appended claims.

I claim:

1. An apparatus for automatically machining an element to conform to a preformed frame, said apparatus comprising a fixed unit and a movable unit relatively movable with respect to said fixed unit, one of said units including spaced aligned holders including a frame holder and an element holder, and means mounting and driving said holders for simultaneous rotation about a common axis, the other of said units including a follower for engagement with the interior surface of a frame carried by said frame holder, and a machine tool component for machining an element carried by said element holder, said follower and said machine tool component being spaced apart and aligned with said frame holder and said element holder, respectively.

2. An apparatus for automatically machining lens edge grinder patterns to fit eyeglass frames comprising a base, a movable support, a shaft, means carried by said movable support mounting said shaft for rotation, an eyeglass frame holder mounted at one end of said shaft and a pattern holder at the other end of said shaft, drive means connected to said shaft for rotating said shaft, means carried by said base mounting said movable support for movement generally normal to the axis of said shaft, fixed supports carried by said base on opposite sides of said movable support, a follower carried by one of said fixed supports for engagement within an eyeglass frame carried by said frame holder, and a machine tool component carried by the other of said fixed supports for machining a pattern carried by said pattern holder.

3. The apparatus of claim 2 wherein said follower and said machine tool component have parallel offset axes, and said follower has a frame engageable surface disposed tangential to an effective working surface of said machine tool component.

4. The apparatus of claim 2 wherein said movable support mounting means includes means releasably urging said movable support in a direction to hold an eyeglass frame carried by said frame holder into engagement with said follower.

5. The apparatus of claim 2 wherein means are provided for mounting said follower for axial movement to provide clearance for the mounting of an eyeglass frame in said frame holder.

6. The apparatus of claim 2 wherein means are provided for mounting said machine tool component for movement to provide clearance for the mounting of a pattern blank in said pattern holder and for initial engagement of said machine tool component with a pattern blank.

7. The apparatus of claim 2 wherein said pattern holder includes means for orienting and holding patterns on a lens edge grinder.

8. A method of machining an element to correspond to a spectacle frame opening comprising the steps of mounting the spectacle frame and the element for rotation about a common axis, orienting a follower and a machine tool component having effective surfaces disposed in spaced substantially tangential alignment, positioning in the spectacle frame said follower and engaging the machine tool component at the outer edge of the element, and then rotating the frame and the element in unison while holding the follower surface in engagement with the frame.

9. The method of claim 8 maintaining the axial relationship of the follower and the machine tool component, and shifting the frame and the element generally transversely of the axis of rotation thereof during the element machining operation.

10. Apparatus for producing a lens pattern substantially conforming to a spectacle frame opening comprising, in combination, blank-and-pattern, guide and cutter support assemblies, means mounting said blank-and-pattern support assembly for movement between and relative to said guide and cutter assemblies, said blank and pattern assembly comprising an arbor journaled for rotation with opposite ends respectively projecting toward said cutter and guide support assemblies, said arbor including blank mounting means at one end adjacent said cutter support assembly for removably receiving a lens pattern blank therein, said cutter support assembly including a power driven cutter rotatably mounted on an axis of rotation parallel to that of said arbor and radially spaced therefrom, said cutter including an effective cutter portion for engaging the edge of the lens pattern blank mounted on said arbor, said arbor including spectacle-frame mounting means on the other end thereof for securing a spectacle frame in a plane substantially normal to the axis of rotation and with a frame in substantially centered alignment with the axis of rotation of said arbor, said guide support assembly including an abutment portion having an effective edge portion in substantial tangential relation to the effective cutter portion of said power driven cutter whereby rotation of said arbor causes said blank-and-pattern assembly to have relative movement with respect to said guide and cutter support assemblies due to rotation of said arbor and in a path of movement controlled by engagement of said effective edge portion in said spectacle frame opening.

11. The structure of claim 10 in which said effective cutter and edge portions are disposed on parallel offset axes of rotation.

12. The structure of claim 10 in which said abutment and cutter portions are displaceably mounted relative to said arbor ends for permitting said spectacle frame and pattern blank to be removed and replaced on the mounting means therefor on said arbor.

13. The structure of claim 10 in which said blank-and-pattern support assembly is pivotally mounted on an axis of oscillation parallel to and disposed below the axis of rotation of said arbor, and biasing means engaging said blank-and-pattern support normally biasing the arbor toward said abutment portion of said guide support assembly.

14. The structure of claim 10 in which spectacle-frame mounting means on said arbor comprise a support flange projecting laterally from said arbor and disposed in spaced relation from the axis of rotation of said arbor, means for clamping a spectacle frame on said mounting means.

15. The structure of claim 14 in which said flange is adjustably mounted for movement parallel to a plane passing through the axis of rotation of said arbor.

References Cited by the Examiner
UNITED STATES PATENTS

| | | | |
|---|---|---|---|
| 1,197,088 | 9/16 | Winkley | 90—13.9 |
| 1,770,498 | 7/30 | Spatenga | 51—101 |
| 2,471,493 | 5/49 | Norton | 51—127 |
| 2,745,319 | 5/56 | Sawyer | 90—13.9 |

LEON PAIR, *Primary Examiner.*